Aug. 28, 1945.   C. J. DELEGARD ET AL   2,383,778
METHOD AND APPARATUS FOR DECORTICATING
Filed March 14, 1942   4 Sheets-Sheet 1
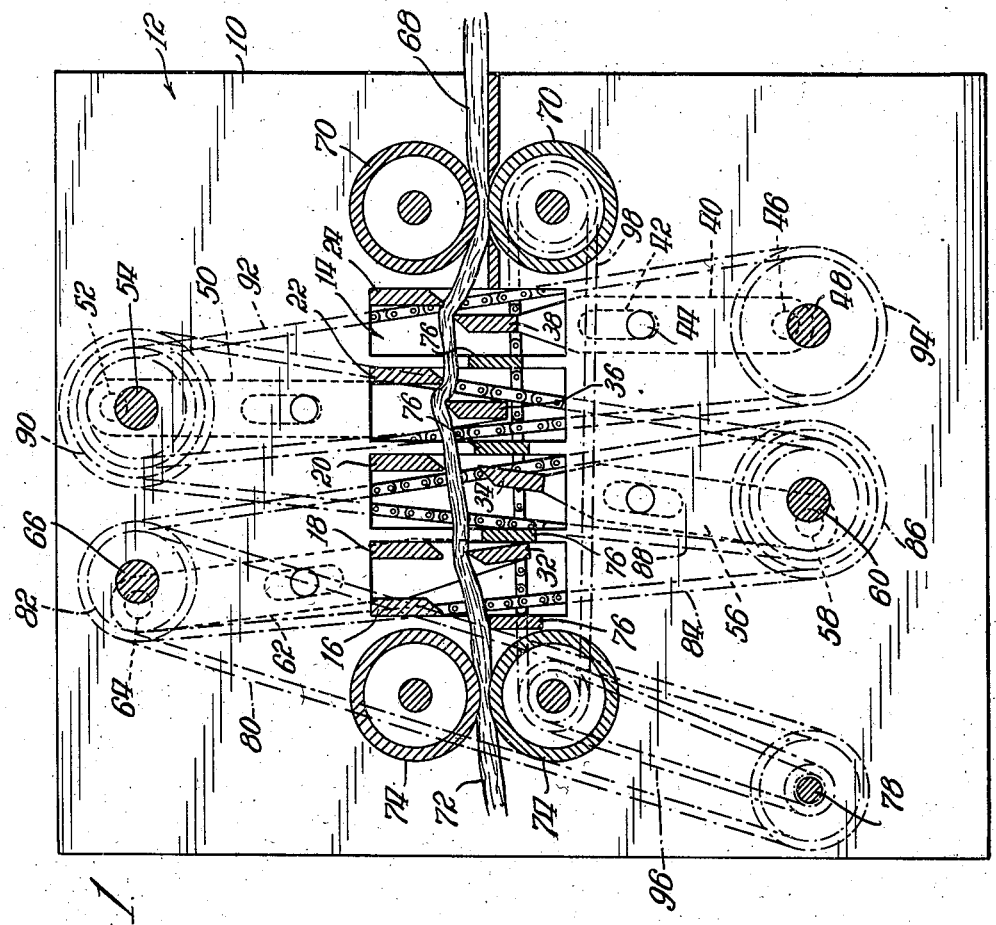
Inventors:
Carl J. Delegard and
Rudolph Kreutz Aug. 28, 1945.   C. J. DELEGARD ET AL   2,383,778
METHOD AND APPARATUS FOR DECORTICATING
Filed March 14, 1942    4 Sheets-Sheet 2

Inventors:
Carl J. Delegard and
Rudolph Kreutz

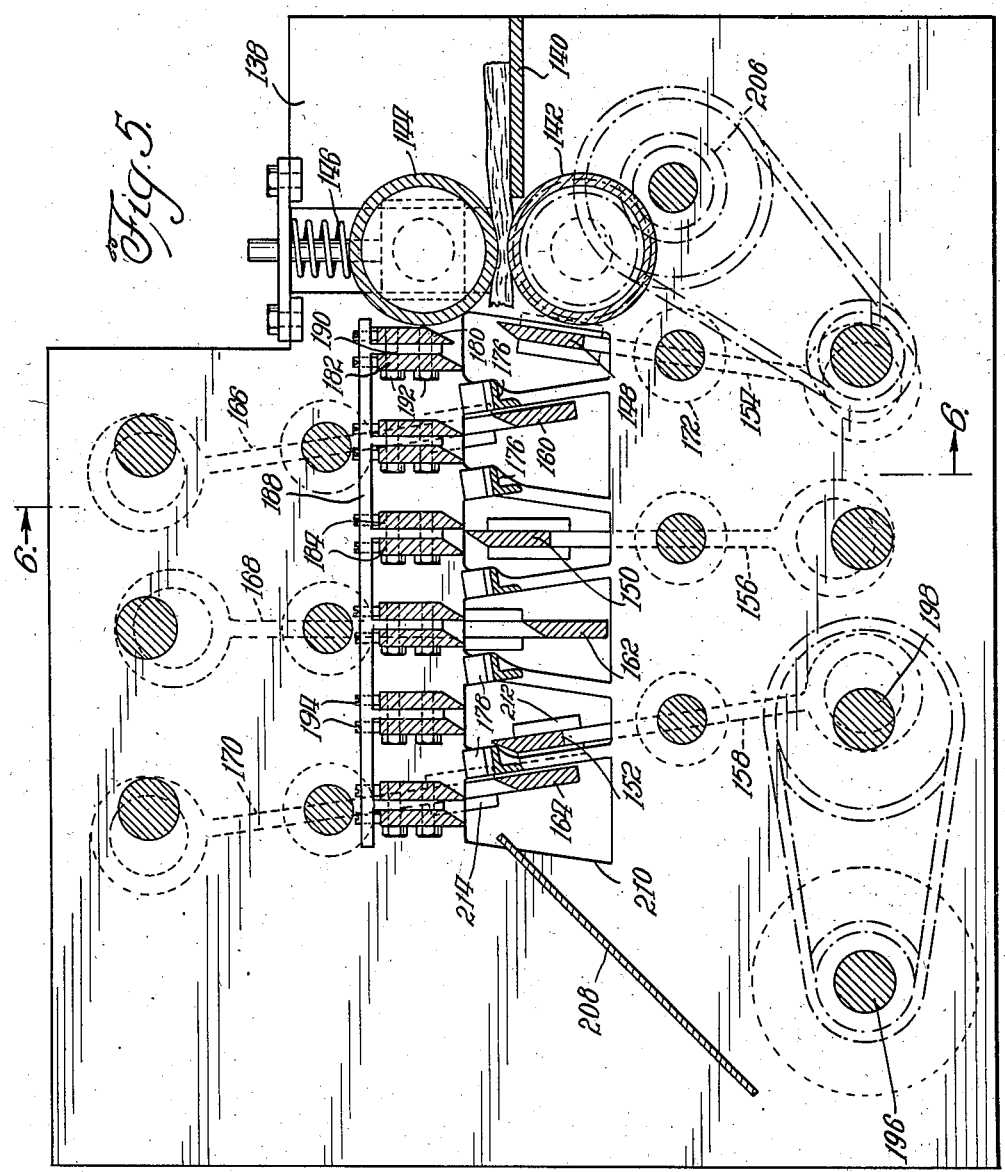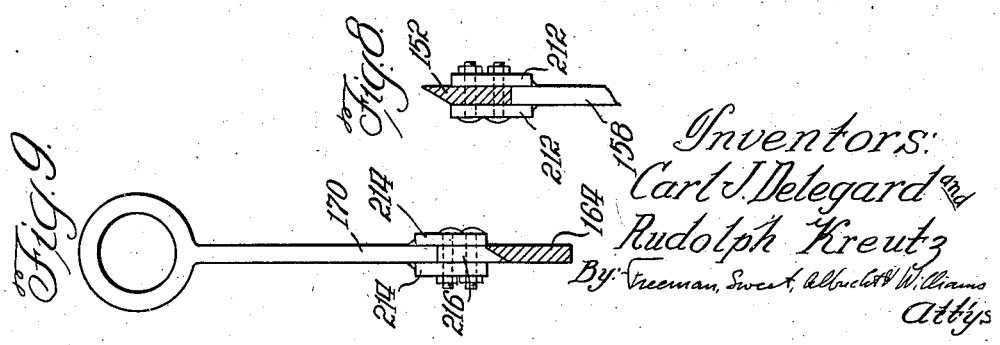

Aug. 28, 1945.   C. J. DELEGARD ET AL   2,383,778
METHOD AND APPARATUS FOR DECORTICATING
Filed March 14, 1942   4 Sheets-Sheet 4
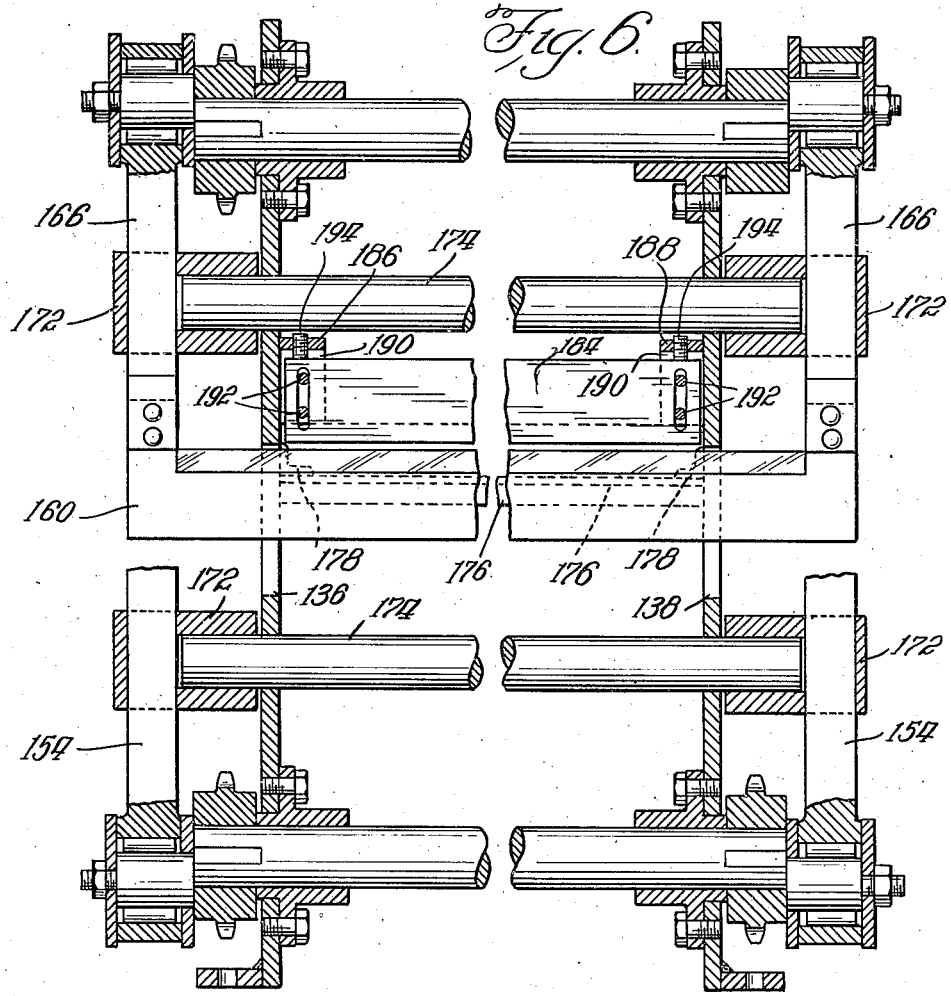
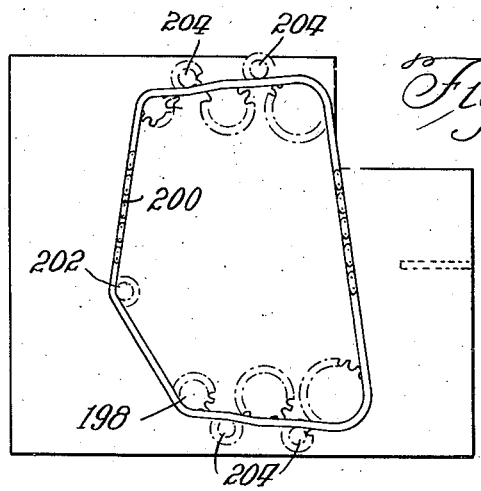
Inventors:
Carl J. Delegard and
Rudolph Kreutz
By: Freeman, Sweet, Albrecht & Williams
Att'ys Patented Aug. 28, 1945

2,383,778

UNITED STATES PATENT OFFICE 2,383,778

METHOD AND APPARATUS FOR DECORTICATING

Carl J. Delegard, Chicago, and Rudolph Kreutz, Elmwood Park, Ill.

Application March 14, 1942, Serial No. 434,638

15 Claims. (Cl. 19—23)

This invention relates to a method and apparatus for decortication particularly suitable in connection with preparation of bast fibres such as hemp and flax. It includes among its objects and advantages a decrease in the amount of mechanical distortion and tension to which it is necessary to subject the fibres to separate them from each other and from the hurds.

In the accompanying drawings:

Figure 1 is a longitudinal vertical section of a decorticating device according to the invention;

Figure 2 is a detail of the end support for a stationary knife;

Figure 5 is a longitudinal vertical section of a six blade decorticator;

Figure 6 is a sectional view as on line 6—6 of Figure 5;

Figure 7 is a side elevation of the same decorticator;

Figure 8 is a detail diagram of the end mounting for a movable knife driven from below; and Figure 9 is a similar diagram of an end mounting for a movable knife driven from above.

Figure 4:
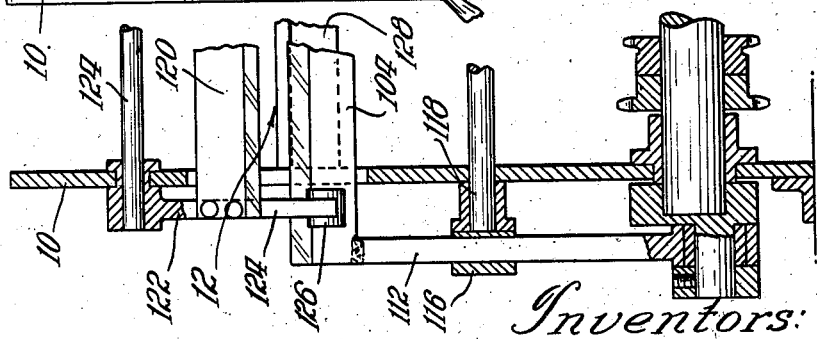
Figure 4 is a detail section as on line 4—4 of Figure 3.

In the embodiment of the invention selected for illustration, spaced side plates 10 define a space 12 (see Figure 4) within which the decorticating knives operate. The stationary knives may be suitably supported on the plates as described in detail hereafter. The movable knives project through the side plates at both ends through apertures 14 in the side plates.

The decorticating elements themselves include a series of stationary blades 16, 18, 20, 22, and 24, each individually adjustable as to its vertical position as by means of suitable screws 26 passing through lugs 28 on the side plates with nuts 30 above and below the lugs.

Each of the movable knives 32, 34, 36, and 38 travels in a substantially circular path remaining at all times perpendicular to the side plates. For this purpose each end of the movable knife 38 is carried by a pitman 40 slotted at 42 to receive a guide pin 44 projecting from the adjacent side plate. The upper end of the pitman carries the adjacent end of the knife 38, and the lower end is driven in a circular path by the crank 46 pivoted at 48. The knife 36 is similarly driven by the pitmans 50 except that the pitmans extend down from above and are driven from the cranks 52 pivoted at 54. Similarly, the movable knife 34 is driven by the pitmans 56 from the crank 58 pivoted at 60. And the last movable blade 32 is driven by the pitmans 62 actuated by the crank 64 pivoted at 66.

The stalks 68 may be fed into the machine in any suitable way as by feed rolls 70 driven at a speed slightly lower than the normal feeding tendency of the first blade 38. The liberated fibre 72 issues from the other side of the equipment and may be suitably guided into any desirable receptacle as by the discharge rolls 74. To support the stalks between blows, and to prevent individual bits of fibre from dropping with the hurds, stationary supporting bars 76 are provided. The upper edges of the bars 76 are spaced below the lower edges of the stationary knives 16, 18, 20, 22, and 24 to define the passageway through which the fibre passes. As the material passes along through the machine, the fibrous shell of the stalk is cracked and split repeatedly by the rapid crushing and scraping action of the movable knives, and the pith constituting the center of the stalk is broken into small fragments, which fragments get twisted so that they protrude between the fibres and are thus combed out both by the movable and the stationary blades. Each of the successive movable blades 38, 36, 34, and 32 is driven at a higher speed than the preceding blade. While the ratio between the speeds of the successive blades may advantageously be varied over a substantial range to secure the best results on various types of material, in one successful machine the blade 32 travels at from 1000 to 1200 R. P. M. and the blade 38 at from 350 to 450 R. P. M. with the intervening blades at intermediate speeds in approximately geometrical progression.

We have indicated suitable drive means for thus actuating the blades comprising a power driven shaft 78 from which a chain 80 runs to a sprocket 82 turning the shaft pivoted at 66. The chain 84 drives the next sprocket 86 at a reduced speed. The chain 88 drives the sprocket 90 at a further reduced speed, and the chain 92 drives the last sprocket 94 at the lowest speed of all.

We have also indicated suitable drive means for the rollers 70 and 74 in the nature of a chain 96 driving the lower roller 74, and a cross chain 98 to drive the lower roller 70.

Figure 3:
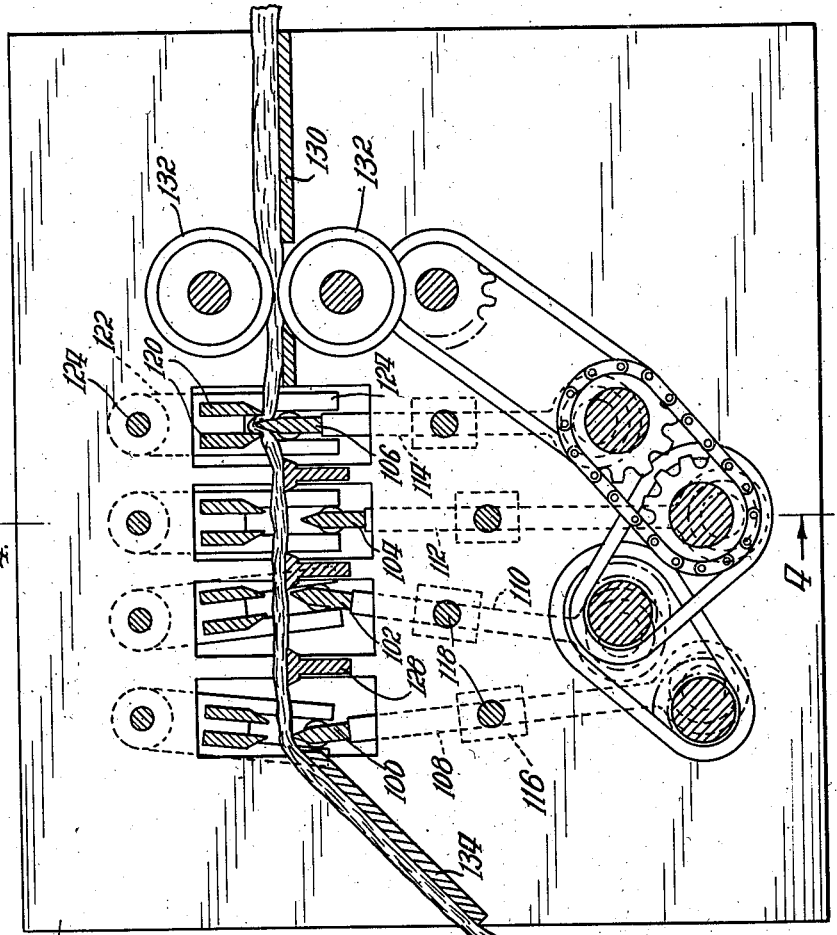
Figure 3 is a similar section of a modified decorticator.

In the embodiment illustrated in Figure 3, the movable knives 100, 102, 104, and 106 are all driven from below on pitmans 108, 110, 112, and 114 respectively, sliding through sleeves 116 pivoted on pintles 118. Cooperating with each lower knife is a pair of upper knives 120. The ends of the upper knives are carried by arms 122 pivoted on pintles 124 so that the arms 120 merely move back and forth through a small circular arc being actuated for such movement by extensions 124 on the arms 122, which extensions straddle guide blocks 126 carried by the lower knives. In this embodiment also, the knife 104 operates at a higher speed than the knife 106; the knife 102 at a higher speed than the knife 104; and the knife 100 at a higher speed than the knife 102. The supports 128 are positioned somewhat lower than in Figure 2 and substantially level with the feed table 130. The feed rolls 132 are driven at a speed slightly slower than the normal feeding tendency of the knife 106, and at the discharge end the separated fibre merely slides down the inclined guide shoe 134.

In the embodiment illustrated in Figures 5 to 9, inclusive, the side plates 136 and 138 are L-shaped and support a stationary shelf 140 (see Figure 5) across which the material slides to pass over the roller 142 and under the roller 144, which upper roller is gently pressed down to bear on the material with slightly more than its own weight, as by coil springs 146. The six movable knives all travel in substantially similar paths. The first, third, and fifth knives 148, 150, and 152 are carried on pitmans 154, 156, and 158, respectively, extending up from below. The second, fourth, and sixth knives 160, 162, and 164 are carried by pitmans 166, 168, and 170 extending down from above. All six sets of pitmans slide through guide heads 172 pivoted for a smaller rocking movement of rotation about a transverse axis as by means of transverse shafts 174 supported by the side plates 136 and 138.

The lower support for the material is a series of transversely extending angle bars 176. Each end of each angle bar is fastened to the adjacent side plate 136 or 138 by a small cleat in the form of an angle piece 178. The upwardly facing legs of the angle bars 176 are slightly inclined forwardly and downwardly as clearly indicated in Figure 5, so that the vibration of the machine in operation will facilitate the dislodgment of hurds which might otherwise pile up enough to obstruct the movement of the material a little, especially if the hurds happened to be quite damp. For each movable knife we provide two stationary upper knives. The upper knives cooperating with the movable knife 148 are identified by the reference characters 180 and 182, and all the succeeding stationary knives are identified by the reference character 184. For the adjustable support of the stationary knives we provide a shelf 186 projecting from the inner face of the side plate 136 and a shelf 188 projecting inwardly at the same level from the other side plate 138. Below each shelf is a series of downwardly projecting fastening plates 190, each fastening plate supporting the adjacent ends of two blades. The ends of the blades are apertured to receive a pair of bolts 192 passing through slotted holes in the supporting plates 190, and adjustment of the height of each stationary blade is by means of adjustable stop screws 194. To adjust any pair of blades, the bolts 192 are loosened and the top screws 194 moved to the desired position. Then the operator pulls up strongly on both blades so that they abut the stops and tightens the bolts 192 to clamp the blades firmly in the desired position.

A suitable source of power indicated at 196 drives the countershaft 198 for the fifth blade 152. Referring to Figure 7, there is indicated a single sprocket chain 200 passing over a tightening idler 202 and then over toothed wheels on the countershafts for driving all six blades, being held in suitable contact by guide idlers 204. The varying diameters of the sprockets for the different blades are arranged to provide the desired variation in the speed of operation of the blades. The roller 142 may be driven through suitable speed reducing gearing indicated at 206 so that the linear speed of its periphery is slightly less than the tendency of the adjacent first movable blade 148 to feed the material through the decorticator. As in the device of Figure 3, the hurds fall down between the movable blades and angle supports 176 and accumulate at the bottom of the space between the side plates 136 and 138, and the finished fibre slides down the inclined guide plate 208. The apertures 210 in each side plate are shaped to provide clearance for the movable blades.

The advantage in driving half the blades from above and the other half from below is to get the blades closer together than could otherwise be done with reasonable clearance between the drive mechanisms. Referring to Figures 8 and 9, the blade 152 is set between receiving plates 212 welded to the upper end of pitman 158. But if the adjacent blade 164 were mounted in identical fashion, the blades would have to be spaced farther apart than shown in Figure 5 so that the fastening plates 212 for the blades 152 and 214 for the blade 164 would not strike each other. Accordingly, the blades driven from above, such as 164, are provided with short upper extensions 216 at their ends, and the fastening plates 214 on the pitman 170 are positioned that much higher up, the pitman being made shorter by a corresponding amount, so that the approximately circular path of the fastening plates 214 is offset upwardly far enough to clear the fastening plates 212 and permit the knives 152 and 164 to be positioned that much closer together in the direction of the movement of the material through the machine.

In all embodiments, the movement of the material through the device is intermittent or slightly jerky because each successive knife would pass the material along a little faster than the preceding knife if it could. Occasionally the second and third knives or the third and fourth knives happen to move in synchronism for a short part of a stroke, and when this happens the fibre will be pulled along a little with respect to any stationary or movable knives preceding it which happen to contact the fibre. In the embodiment of Figure 3, this action is slightly more pronounced than in the embodiment of Figure 1, but in the embodiment of Figure 1 each stroke of a movable knife, as it passes close by the edge of its cooperating stationary knife, causes the movable knife to scrape the lower side of the material in one direction while the movement of the material causes it to scrape against the upper knife in the other direction. And because each set of knives operates at a different speed from the preceding knife, the breaks and scrapings of each knife will be extensively mismatched with the breaks and scrapings of the preceding knife so that by the time the fibre reaches the discharge end of the machine, it becomes a hank of loose and substantially clean fibres, from which substantially all the hurds have been dislodged. At the same time none of the distortions to which the fibre has been subjected have been so violent as to rupture the individual strands of fibre.

In the embodiment of Figure 1, the movable knife travels past one stationary knife and up between that knife and the stationary knife for the next movable knife, and thus the material is flexed between successive stationary knives spaced rather widely apart. In the embodiment of Figure 5, each movable knife is provided with two stationary knives and operates below those two knives in such a way that it does not move up between its own stationary knives and the stationary knives of the next movable knife.

The criterion of success is to split the shell of the stalk without bending the stalk transversely enough to cause any transverse breaks in the stalk or in the fibres into which the stalk is to be disintegrated by splitting. With stalks and fibres extremely resistant to transverse breakage by flexure, the embodiment of Figure 3 can be made to obtain best results. With a greater degree of weakness against transverse flexure, the embodiment of Figure 1 will be more satisfactory, and with a still greater sensitivity and tendency to break transversely, the embodiment of Figure 5 will provide a maximum of flattening and scraping combined with a minimum of bending.

In all the embodiments shown we prefer to have a greater clearance between first beater knife or blade and its cooperating relatively stationary blade than between the second beater and its cooperating blade. This permits the relatively large amount of pith, hurds, or shives that must pass beyond the first blade, to go through without obstruction, at rates of feed that would otherwise be too much for the machine. And a similar but lesser decrease is desirable throughout the rest of the series. This is less important in the embodiment of Figure 3 where the upper blades do not move up and down to beat the material but do have a component of motion in the direction of movement of the material during their operative contact with the material.

Without further elaboration the foregoing will so fully explain the invention that others may, by applying knowledge current at the time of this application, readily adapt the same for use under various conditions of service.

What is claimed is:

1. Decorticating equipment comprising, in combination: an interrupted support constructed and arranged to guide fibrous stalk material in a generally plane approximately horizontal path; a plurality of edged movable beater blades extending substantially parallel to the plane of said support and transverse to the fibres of said material; means for moving each blade with a movement of translation normal to its edge through a continuous closed path including an arcuate portion extending into and out of the working space occupied by the material adjacent said support; said blades being arranged in series along the path of the material, and all having movement in the same direction as the movement of the material during that portion of their movement in which they engage the material; an adjustable stationary blade means for each of said movable blades; each stationary blade means having a plurality of acting edges parallel to said movable blade and positioned out of but closely adjacent to the path of said movable blade; whereby said movable blade partially crushes a stalk or stalk fragment larger than the clearance between its path and the cooperating stationary blade means and simultaneously combs or scrapes the material along, while the portion of the material engaging said stationary blade means is crushed and combed in the opposite sense by its own longitudinal movement; the clearances between the movable and stationary blades decreasing in the direction of travel of the material; drive connections for driving each movable blade at a materially higher speed than the preceding one; a feed table for delivering material to said support; feed rolls positioned to engage opposite sides of a layer of material entering the working space; and drive means for turning said rolls with a peripheral speed slightly less than the linear speed with which said beaters tend to feed the material through the working space.

2. Decorticating equipment comprising, in combination: a support constructed and arranged to guide fibrous stalk material in a generally plane path; a plurality of edged movable beater blades extending substantially parallel to the plane of said support and transverse to the fibres of said material; means for moving each blade with a movement of translation normal to its edge through a continuous closed path including an arcuate portion extending into and out of the working space occupied by the material adjacent said support; said blades being arranged in series along the path of the material, and all having movement in the same direction as the movement of the material during that portion of their movement in which they engage the material; an adjustable stationary blade means for each of said movable blades; each stationary blade means having an acting edge parallel to said movable blade and positioned out of but closely adjacent to the path of said movable blade; whereby said movable blade partially crushes a stalk or stalk fragment larger than the clearance between its path and the cooperating stationary blade means and simultaneously combs or scrapes the material along, while the portion of the material engaging said stationary blade means is crushed and combed in the opposite sense by its own longitudinal movement; the clearances between the movable and stationary blades decreasing in the direction of travel of the material; drive connections for driving each movable blade at a materially higher speed than the preceding one; and a feed table for delivering material to said support.

3. Decorticating equipment comprising, in combination: a support constructed and arranged to guide fibrous stalk material in a predetermined path; a plurality of edged movable beater blades extending substantially parallel to the plane of said support and transverse to said predetermined path and to the fibres of said material; means for moving each blade with a movement of translation normal to its edge through a continuous closed path including a portion extending into and out of the working space occupied by the material adjacent said support; said blades being arranged in series along the path of the material, and all having movement in the same direction as the movement of the material along its predetermined path during that portion of their movement in which they engage the material; an adjustable stationary blade means for each of said movable blades; each stationary blade means having an acting edge parallel to said movable blade and positioned out of but closely adjacent to the path of said movable blade; whereby said movable blade partially crushes a stalk or stalk fragment larger than the clearance between its path and the cooperating stationary blade means and simultaneously combs or scrapes the material along, while the portion of the material engaging said stationary blade means is crushed and combed in the opposite sense by its own longitudinal movement; the clearances between the movable and stationary blades decreasing in the direction of travel of the material.

4. Decorticating equipment comprising, in combination: a support constructed and arranged to guide fibrous stalk material in a predetermined path; a plurality of edged movable beater blades extending substantially parallel to the plane of said support and transverse to said predetermined path and to the fibres of said material; means for moving each blade with a movement of translation normal to its edge through a continuous closed path including a portion extending into and out of the working space occupied by the material adjacent said support; said blades being arranged in series along the path of the material, and all having movement in the same direction as the movement of the material along its predetermined path during that portion of their movement in which they engage the material; an adjustable stationary blade means for each of said movable blades; each stationary blade means having an acting edge parallel to said movable blade and positioned out of but closely adjacent to the path of said movable blade; whereby said movable blade partially crushes a stalk or stalk fragment larger than the clearance between its path and the cooperating stationary blade means and simultaneously combs or scrapes the material along, while the portion of the material engaging said stationary blade means is crushed and combed in the opposite sense by its own longitudinal movement.

5. The method of decorticating stalks containing bast fibres which comprises: supporting said stalks in horizontal position; striking said stalks from below with tools moving diagonally upward and longitudinally of said stalks, the longitudinal movement being always in the same direction whereby a feeding movement of said stalks is produced; limiting the upward displacement of the stalks when struck, by stationary tools overlying said stalks and located close to the path of the striking tools; striking the fresh stalks with a given relatively low frequency and relatively large spacing between successive blows; striking the partially cracked stalks with a higher frequency and shorter spacing; and striking the substantially separated fibre with a still higher frequency and still shorter spacing.

6. The method of decorticating stalks containing fibres which comprises: supporting said stalks on a support; striking said stalks from below with tools moving diagonally upward and longitudinally of said stalks, the longitudinal movement being always in the same direction whereby a feeding movement of said stalks is produced; limiting the upward displacement of the stalks when struck, by stationary tools overlying said stalks and located close to the path of the striking tools; striking the fresh stalks with a given relatively low frequency and relatively large spacing between successive blows; and striking partially cracked stalks with a higher frequency and shorter spacing.

7. The method of decorticating stalks containing fibres which comprises: supporting said stalks on a support; striking said stalks from below with tools moving diagonally upward and longitudinally of said stalks, the longitudinal movement being always in the same direction whereby a feeding movement of said stalks is produced; limiting the upward displacement of the stalks when struck, by stationary tools overlying said stalks and located close to the path of the striking tools; striking the fresh stalks with a given relatively low frequency and relatively large spacing between successive blows; and striking partially cracked stalks with a higher frequency and shorter spacing; the fresh stalks being struck with a predetermined clearance between the moving and stationary tools; the partially cracked stalks being struck with a smaller clearance between the moving and stationary tools.

8. Decorticating equipment comprising, in combination; a support constructed and arranged to support material in the form of stalks to be decorticated in a horizontal position; stationary knives arranged in series and spaced from said support to define a passageway for the stalks; and a series of movable knives guided to strike the stalks in said passageway toward said stationary knives and longitudinally all in the same direction; each moving knife traveling in a substantially closed approximately circular path, only the upper portion of which enters said passageway; each moving knife passing close to but not striking an adjacent stationary knife near the upper portion of its path; whereby the movement of the stalks as the moving knives strike them, causes the stalks to strike against and simultaneously slide along the stationary knives to comb out hurds along the top of each progressively splitting and flattening stalk, and at the same time the moving knives strike and slide along the stalk to comb out hurds along the bottom; the first moving knife striking the whole stalks operating with relatively low speed and having a relatively large clearance from its cooperating stationary knife; moving knives later in the series operating at successively higher speeds and with successive smaller clearances.

9. Decorticating equipment comprising, in combination: a support constructed and arranged to support material in the form of stalks to be decorticated; stationary knives arranged in series and spaced from said support to define a passageway for the stalks; and a series of movable knives guided to strike the stalks in said passageway toward said stationary knives and longitudinally all in the same direction; each moving knife traveling in a substantially closed approximately circular path; only the upper portion of which enters said passageway; each moving knife passing close to but not striking an adjacent stationary knife near the upper portion of its path; whereby the movement of the stalks as the moving knives strike them, causes the stalks to strike against and simultaneously slide along the stationary knives to comb out hurds along the top of each progressively splitting and flattening stalk, and at the same time the moving knives strike and slide along the stalk to comb out hurds along the bottom; the first moving knife striking the whole stalks operating with relatively low speed and having a relatively large clearance from its cooperating stationary knife; moving knives later in the series operating at successively higher speeds and with successively smaller clearances.

10. Decorticating equipment comprising, in combination: a support constructed and arranged to support material in the form of stalks to be decorticated; stationary knives arranged in series and spaced from said support to define a passageway for the stalks; and a series of movable knives guided to strike the stalks in said passageway toward said stationary knives and longitudinally all in the same direction; each moving knife traveling in a substantially closed path, only the upper portion of which enters said passageway; each moving knife passing close to but not striking an adjacent stationary knife near the upper portion of its path; whereby the movement of the stalks as the moving knives strike them, causes the stalks to strike against and simultaneously slide along the stationary knives to comb out hurds along the top of each progressively splitting and flattening stalk, and at the same time the moving knives strike and slide along the stalk to comb out hurds along the bottom; the first moving knife striking the whole stalks operating with relatively low speed and having a relatively large clearance from its co-operating stationary knife; moving knives later in the series operating at successively higher speeds and with successively smaller clearances.

11. Decorticating equipment comprising, in combination: a support constructed and arranged to support material in the form of stalks to be decorticated; stationary knives arranged in series and spaced from said support to define a passageway for the stalks; and a series of movable knives guided to strike the stalks in said passageway toward said stationary knives and longitudinally all in the same direction; each moving knife passing close to but not striking an adjacent stationary knife near the upper portion of its path; whereby the movement of the stalks as the moving knives strike them, causes the stalks to strike against and simultaneously slide along the stationary knives to comb out hurds along the top of each progressively splitting and flattening stalk, and at the same time the moving knives strike and slide along the stalk to comb out hurds along the bottom; the first moving knife striking the whole stalks operating with relatively low speed and having a relatively large clearance from its cooperating stationary knife; moving knives later in the series operating at successively higher speeds and with successively smaller clearances.

12. Decorticating equipment comprising, in combination: a support constructed and arranged to support material in the form of stalks to be decorticated; stationary knives arranged in series and spaced from said support to define a passageway for the stalks; and a series of movable knives guided to strike the stalks in said passageway toward said stationary knives and longitudinally all in the same direction; whereby the movement of the stalks as the moving knives strike them, causes the stalks to strike against and simultaneously slide along the stationary knives to comb out hurds along the top of each progressively splitting and flattening stalk, and at the same time the moving knives strike and slide along the stalk to comb out hurds along the bottom; the first moving knife striking the whole stalks operating with relatively low speed; the next knife operating at a higher speed.

13. The method of decorticating stalks containing fibres which comprises: supporting said stalks on a support; striking said stalks from below with tools moving diagonally upward and longitudinally of said stalks, the longitudinal movement being always in the same direction whereby a feeding movement of said stalks is produced; limiting the upward displacement of the stalks when struck, by tools overlying said stalks and located close to the path of the striking tools; striking the fresh stalks with a given relatively low frequency and relatively large spacing between successive blows; and striking partially cracked stalks with a higher frequency and shorter spacing.

14. Decorticating equipment comprising, in combination: means for feeding stalks in a predetermined path, with the stalks extending longitudinally along the path of movement; a plurality of spaced supporting elements arranged transversely to and below the path of the stalks; a plurality of beater elements each guided to remain at all times parallel to said supporting elements and to move repeatedly up into beating engagement with the material, with a component of motion in the direction of movement of the materials; and backing means overlying the path of the material to hold the material in position to receive the impacts of said beater elements; said backing means also having a component of motion in the direction of movement of the material during the contact between the material and the backing means.

15. Decorticating equipment comprising, in combination: means for feeding stalks in a predetermined path; a plurality of spaced supporting elements arranged transversely to and below the path of the stalks; a plurality of beater elements each guided to remain at all times transverse to said predetermined path and to move repeatedly up into beating engagement with the material, with a component of motion in the direction of movement of the material; and backing means overlying the path of the material to hold the material in position to receive the impacts of said beater elements; said backing means also having a component of motion in the direction of movement of the material during the contact between the material and the backing means.

CARL J. DELEGARD.
RUDOLPH KREUTZ.